3,310,958
SALT WATER ICE MAKING MACHINE
Leonard A. Stiller, Fort Lauderdale, Fla., assignor to Lasco Industries, Inc., Fort Lauderdale, Fla., a corporation of Florida
Filed Jan. 10, 1966, Ser. No. 519,741
6 Claims. (Cl. 62—348)

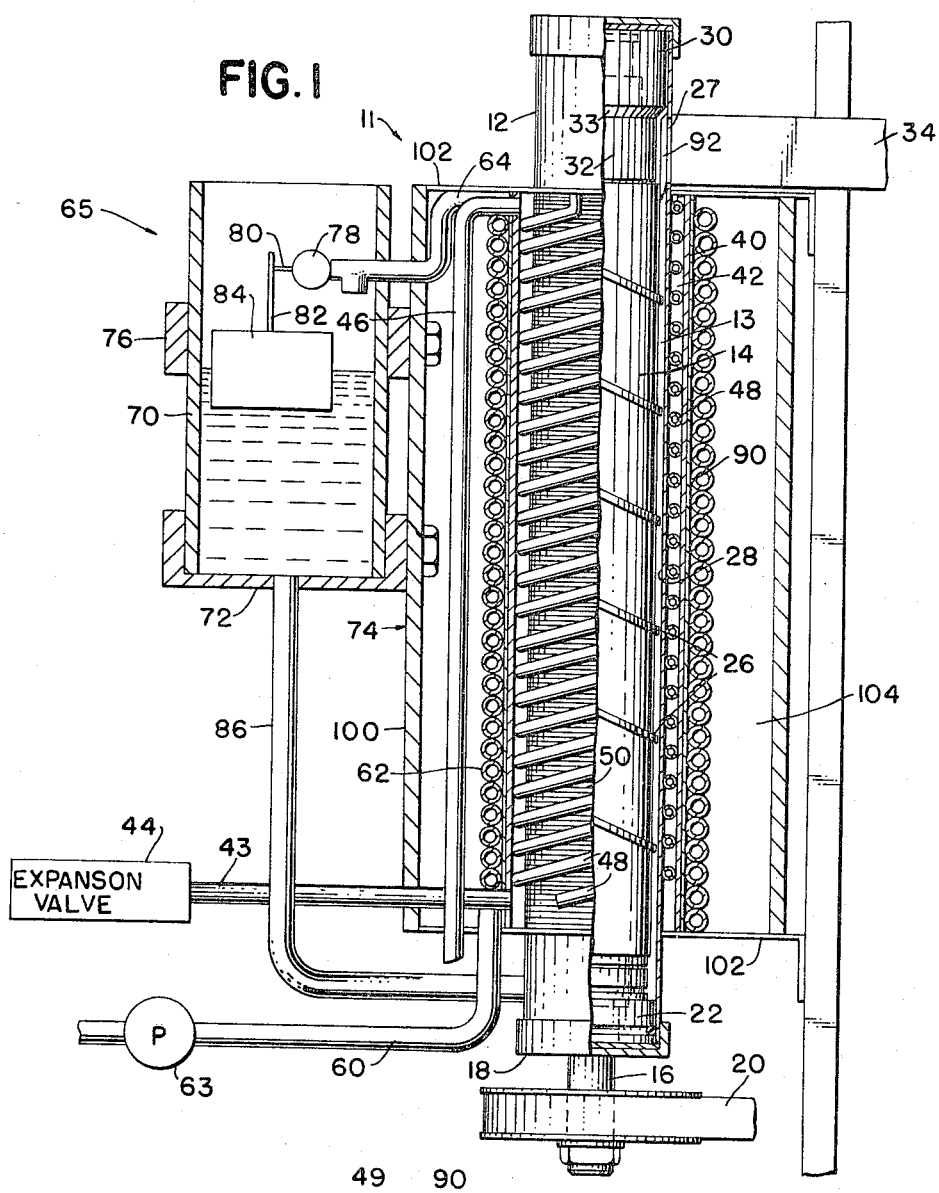

This invention relates generally to ice making apparatus, and refers more particularly to a machine for making ice from salt water.

The present invention provides an improved machine for making ice which is particularly adapted to be used on small fishing craft and similar installations.

It is an essential object of this invention to provide an ice making machine having improved means for rapidly and efficiently making chipped ice.

Another object of the invention is to provide an ice making machine having improved means for rapidly and efficiently chilling the freezing chamber.

Another object is to provide an ice making machine having a cylinder defining therein a freezing chamber, refrigerating means surrounding the cylinder to refrigerate the freezing chamber, and ribbing formed on the cylinder to increase the surface area thereof and thereby increase the rapidity and efficiency with which the chilling of the freezing chamber takes place.

Another object is to provide means for pre-cooling the water before it is introduced into the freezing chamber, a reservoir for pre-cooled water, and a valve operated by the reservoir for controlling the flow of pre-cooled water into the reservoir.

Other objects and features of the invention will become apparent as the description proceeds, especially when taken in conjunction with the accompanying drawings, illustrating a preferred embodiment of the invention, wherein:

FIGURE 1 is a central, vertical sectional view, with part in elevation, of a machine constructed in accordance with the invention.

FIGURE 2 is an enlargement of a portion of FIGURE 1.

Referring to the drawing, the machine is generally designated 11, and includes a vertical cylinder 12, the interior of which defines a freezing chamber 13. This cylinder is preferably formed of metal having a relatively high conductivity.

An auger 14 is disposed within the freezing chamber in concentric relation therewith. The lower end of the auger has a reduced portion 16 which projects through the bottom wall 18 of the cylinder. A belt 20 extends over a pulley secured on the lower end 16 of the auger and is driven by a suitable means not shown, to rotate the auger. A bearing 22 in the bottom of the cylinder supports the lower reduced end portion 16 of the auger for rotation. The auger will normally be turned on the order of about 14 revolutions per minute, but of course the speed may be varied considerably as desired.

The main body portion of the auger is spaced from the cylindrical wall 28 of the freezing chamber. A helical rib or blade 26 is provided on the body portion of the auger and extends throughout substantially the full length thereof. The blade 26 extends close to the cylindrical wall 28 of the freezing chamber to scrape ice formed thereon and elevate it for discharge through the outlet 27 near the upper end of the cylinder. A bearing 30 supports the upper reduced end of the auger. The bearing is shaped with a cylindrical portion 32 spaced radially inwardly from the wall 28 of the freezing chamber opposite the outlet 27, and with an annular frusto-conical portion 33 for deflecting the ice through outlet 27.

A chute 34 extends from the outlet 27 to a suitable collection bin.

Throughout a major portion of its length, the cylinder 12 is surrounded by a second cylinder 40 in concentric radially outwardly spaced relation thereto. The annular space 42 between the cylinders 12 and 40 provides a passage for coolant. A suitable coolant such as Freon from a compressor not shown, is flowed through the annular space 42, entering through pipe 43 and expansion valve 44, and returning to the compressor by way of the pipe 46.

A helical member 48 surrounds cylinder 12 in the space between cylinders 12 and 40. This helical member is in the form of a hollow tube of uniform inside and outside diameter, and throughout its entire length is in continuous line contact with the cylinders 12 and 40. Tube 48 is sealed at the ends to isolate the interior of the tube from the Freon flowing through passage 42. The convolutions of the tube are spaced from one another uniformly as indicated. The space between adjacent convolutions is slightly greater than the outside diameter of the tube 48. The tube 48 occupies less than half the volume of space between cylinders 12 and 40 so that the helical passage from inlet to outlet defined between the cylinders is greater than the space occupied by the tube itself. Since the tube 48 has substantially only line contact with the cylinder 12, substantially the entire outer surface of the tube 12 is exposed to the coolant flowing through the helical passage between the cylinders. Accordingly, the reduction in surface area of the cylinder 12 exposed to the action of the coolant because of contact with the helical tube 48 is extremely small.

As seen particularly in FIGURE 2, the outside wall of the cylinder 12 is formed with a plurality of closely spaced annular grooves 49 concentric with the cylinder axis, producing ribs or fins 50 between the grooves. The surface area of the outside wall of cylinder 12 is thereby increased by the fin formations. Accordingly, a greater rate of heat transfer from the freezing chamber outward to the space between cylinders 12 and 40 is effected. In this way the efficiency of the freezing chamber and the rapidity with which ice is formed, is increased.

Salt water is conducted through the inlet pipe 60 to the helical pre-cooling coil 62 which surrounds cylinder 40. The pump 63 is provided to pump the water into the inlet pipe 60. The outlet pipe 64 of the pre-cooling coil then enters the reservoir 65. The reservoir is in the form of a cylinder 70 and has a bottom plate 72 secured directly to the housing 74. A ring 76 also surrounds cylinder 72 and likewise is secured to the housing wall.

The outlet pipe 64 leads into reservoir 65 and is controlled by a valve 78. The valve 78 is connected to a lever 80 operated by a link 82 on the reservoir float 84. As the level of water in the reservoir rises, the float rises to close the valve 78 and shut off the outlet pipe 64. The float may also shut off the sea water pump, through the operation of a suitable control not shown, although this is not necessary where the pump does not generate too much pressure and particularly if it has a relief valve. As the level in the reservoir drops, the valve 78 is opened (and the sea water pump is started if it was stopped) to pump more sea water. From the bottom of the reservoir, the pipe 86 leads to the lower end of cylinder 12 to admit pre-cooled sea water to the freezing chamber.

The pre-cooling coil 62 is preferably separated from cylinder 40 by a thin insulation strip of cylindrical form designated 90. Accordingly the salt water is pre-cooled before it enters the freezing chamber, but the insulation strip prevents the salt water from becoming frozen and clogging the pre-cooling coil. The insulation strip in some instances may be omitted, the cylinder 40 then being relied upon to provide sufficient insulation between the pre-cooling coil and the space 42.

A cleaning pin 92 projects radially outward from the auger and then in an upward direction parallel to the axis of the auger. The cleaning fin is disposed adajacent the outlet 27 and has an upper end ajacent to and beveled at the same angle as the frusto-conical surface 33. The cleaning pin is provided to break up and clear ice which may otherwise accumulate at the upper end of the auger so that it may readily be deflected by the frusto-conical surface 33 out through the chute 34.

The coolant in the helical space 42 is preferably at a temperature such that the interior of the freezing chamber is maintained at about —50° F. which is a sufficiently low temperature to freeze salt water relatively rapidly. The salt water is conducted into the freezing chamber through the inlet 86 and on contact with the wall 28 of the freezing chamber is rapidly changed into a slush which is elevated through the freezing chamber by the blade or rib 26 of the auger for discharge in a chipped or flaked, but solid, state through the outlet 27. The freezing chamber 15 is rapidly cooled by the passage of Freon or other suitable coolant through the helical space 42. The helical passage produced by the member 48 causes a uniform flow of the coolant in contact with substantially the entire outer surface of cylinder 12. While inducing a helical flow, the tubular member 48 does not substantially reduce the surface area of cylinder 12 in contact with the flowing coolant, because the member 48 is of circular cross section and has only substantially line contact with the cylinder. Also, the total space between the cylinders, over any given length of the space, is reduced by less than half because of the circular cross section of member 48 and the fact that adjacent convolutions are spaced slightly greater than the outside diameter of member 48. Moreover, the grooving of the outer surface of cylinder 12 to provide the fins or ribs 50 increases the surface area of cylinder 12 and promotes a more rapid transfer of heat from the freezing chamber outward.

The housing 74 includes a cylindrical shell 100 and end plates 102. The unit is enclosed with the housing, and the housing around the unit is filled with a suitable insulation material 104. The end plates enclose and seal the ends of the space 42 between the cylinders. The shell 100 and lower end plate 102 have suitable openings to accommodate the pipes 43, 46, 60 and 64.

While the machine is espeically suited to make ice from salt or sea water, fresh water may also be used.

What I claim as my invention is:

1. An ice making machine comprising a cylinder defining therein a cylindrical freezing chamber, means for introducing water into said chamber, refrigerating means extending about said cylinder throughout a substantial axial extent of the latter for chilling said chamber to form ice on the wall thereof, said water introducing means including a helical water pre-cooling tube encircling said refrigerating means throughout at least a portion of its length, said refrigerating means including an outer cylinder surrounding said first-mentioned cylinder in coaxial radially spaced relation, an inlet for introducing a coolant into the space between said cylinders and an outlet spaced axially from said inlet for the discharge of coolant from said space, said pre-cooling tube encircling said outer cylinder, a pre-cooled water reservoir, an outlet from said pre-cooling tube leading to said reservoir, an outlet from said reservoir leading into said chamber, an ice outlet from said chamber, auger means in said chamber for removing ice from said chamber wall and discharging the same through said ice outlet, and circumferentially extending fins on the outer surface of said first-mentioned cylinder to enhance the heat transfer characteristics thereof.

2. The ice making machine defined in claim 1, wherein means are provided for inducing a helical flow of coolant in said space between said coolant inlet and said coolant outlet.

3. The ice making machine defined in claim 2, wherein said means for inducing a helical flow of coolant comprises a helical member in said space in contact with said cylinders and extending substantially the entire distance between said coolant inlet and outlet.

4. The ice making machine defined in claim 3, wherein said freezing chamber, refrigerating means and pre-cooling tube are enclosed in a housing packed with insulation.

5. An ice making machine comprising a cylinder defining therein a cylindrical freezing chamber, means for introducing water into said chamber, refrigerating means extending about said cylinder throughout a substantial axial extent of the latter for chilling said chamber to form ice on the wall thereof, said water introducing means including a helical water pre-cooling tube encircling said refrigerating means throughout at least a portion of its length, said refrigerating means including an outer cylinder surrounding said first-mentioned cylinder in coaxial radially spaced relation, an inlet for introducing a coolant into the space between said cylinders and an outlet spaced axially from said inlet for the discharge of coolant from said space, said pre-cooling tube encircling said outer cylinder, an ice outlet from said chamber, auger means in said chamber for removing ice from said chamber wall and discharging the same through said ice outlet, and circumferentially extending fins on the outer surface of said first-mentioned cylinder to enhance the heat transfer characteristics thereof.

6. The ice making machine defined in claim 5, wherein means are provided for inducing a helical flow of coolant in said space between said coolant inlet and said coolant outlet comprising a helical member in said space in contact with said fins and said outer cylinder and extending substantially the entire distance between said coolant inlet and coolant outlet.

References Cited by the Examiner

UNITED STATES PATENTS

| | | | |
|---|---|---|---|
| 1,641,429 | 9/1927 | Heyman et al. | 62—354 X |
| 2,080,639 | 5/1937 | Taylor | 62—354 |
| 2,877,632 | 5/1959 | Chaplik et al. | 62—320 |

ROBERT A. O'LEARY, *Primary Examiner.*

W. E. WAYNER, *Assistant Examiner.*